May 19, 1970 W. H. JENKINS ET AL 3,512,254

METHOD OF MAKING AN ELECTRICAL DEVICE

Original Filed Aug. 10, 1965 2 Sheets-Sheet 1

INVENTORS.
Weston H. Jenkins
Walter H. Tarcza
BY Walter S. Zebrowski
ATTORNEY

INVENTORS.
Weston H. Jenkins
Walter H. Tarcza
BY Walter S. Zelinski
ATTORNEY 3,512,254

METHOD OF MAKING AN ELECTRICAL DEVICE

Weston H. Jenkins, Corning, and Walter H. Tarcza, Painted Post, N.Y., assignors to Corning Glass Works, Corning, N.Y., a corporation of New York Continuation of application Ser. No. 478,650, Aug. 10, 1965. This application Dec. 14, 1967, Ser. No. 690,651
Int. Cl. H01c *9/00, 17/00;* H05k *5/06*
U.S. Cl. 29—620 2 Claims

ABSTRACT OF THE DISCLOSURE

A method of forming a hermetic seal about a thin film microcircuit without deleteriously affecting the circuit components is disclosed. A metallic ring or band having two flat mating surfaces has an adherent film of vitreous material applied to one surface thereof. The ring is disposed over a flat dielectric substrate with the vitreous material contacting the substrate, and heat and pressure are applied to fuse the vitreous film to the substrate. After the completion of the last mentioned step electrical components may be added to the substrate or components which had been on the substrate may be adjusted. Thereafter, a metallic sheet is hermetically bonded to the other mating surface of the ring by a relatively low temperature bonding technique.

CROSS-REFERENCES TO RELATED APPLICATIONS

This application is a continuation of co-pending application Ser. No. 478,650, filed Aug. 10, 1965, now abandoned.

BACKGROUND OF THE INVENTION

Electrical devices such as integrated circuits, electroconductive film resistors, transistors, diodes, semiconductors, and the like are commonly sealed in a "flatpack" which is a container or enclosure having a body of electrically insulating material. Such a body is formed with a relatively large planar bottom wall surrounded by a rim defining a cavity within which an electrical device is disposed. Leads extending from within said cavity to the outside of said body are provided. The electrical device is connected to said leads within said cavity and is enclosed therein by a rigid cover plate disposed over the cavity and sealed to said rim.

Such devices are also commonly sealed in "cans" by first being mounted on a plate through which the leads pass, and thereafter being enclosed within a metallic cup-like member attached or sealed to said plate, as for example, by means of crimping the can about the plate edge, cementing, soldering, or the like.

Prior art methods of enclosing electrical devices involved sealing temperatures and cycles which deleteriously affected the devices causing the values of their electrical properties and characteristics to change. Further such methods were: costly as a result of both numerous parts required and time necessary for assembly and sealing; did not provide for maintaining heat away from the device during final sealing; did not provide means for adjustment or compensation of the values of electrical properties of the device prior to final sealing, which values may have been affected or changed as a result of employing elevated temperatures during preliminary steps of the encapsulation method; resulted in large bulky enclosures; and the like.

SUMMARY OF THE INVENTION

It is an object of the present invention to provide a hermetic enclosure, an electrical device assembly, and a method of manufacture which overcome the heretofore noted disadvantages.

A further object of the present invention is to provide an economic method for hermetically enclosing electrical devices without deleteriously affecting the values of their electrical properties or characteristics.

Another object is to provide a method of forming an enclosed electrical device having predetermined desired values of electrical properties.

A further object is to provide a small hermetically sealed enclosure which is noted for its economy and ease of manufacture.

A still further object is to provide a small, economic, hermetically sealed electronic device.

Broadly, according to the instance invention, an enclosure may be manufactured by providing a substrate with an electrical device disposed thereon, a metallic sheet, and a metallic ring or band having two flat mating surfaces; applying an adherent film of vitreous material, having a coefficient of thermal expansion compatible with that of the substrate and a softening temperature less than the melting temperature of the substrate and ring materials, to one mating surface of the ring; disposing the ring surrounding the device with the film adjacent the substrate; applying heat and pressure to the assembly so formed to fuse the ring to the substrate by means of the vitreous material; adjusting or compensating the values of the various electrical properties or characteristics of the device as desired; disposing said sheet on the other mating surface of the ring; and thereafter hermetically bonding the sheet to the ring at relatively low temperatures by soldering, welding, ultrasonic bonding, diffusion, or the like.

Additional objects, features, and advantages of the present invention will become apparent to those skilled in the art, from the following detailed description and the attached drawing on which, by way of example, only the preferred embodiments of this invention are illustrated.

DETAILED DESCRIPTION

For the purposes of simplicity this invention will be described in terms of encapsulating a thin film microcircuit although, as will be readily understood by one familiar with the art, other devices can be similarly hermetically encapsulated.

Figure 1:
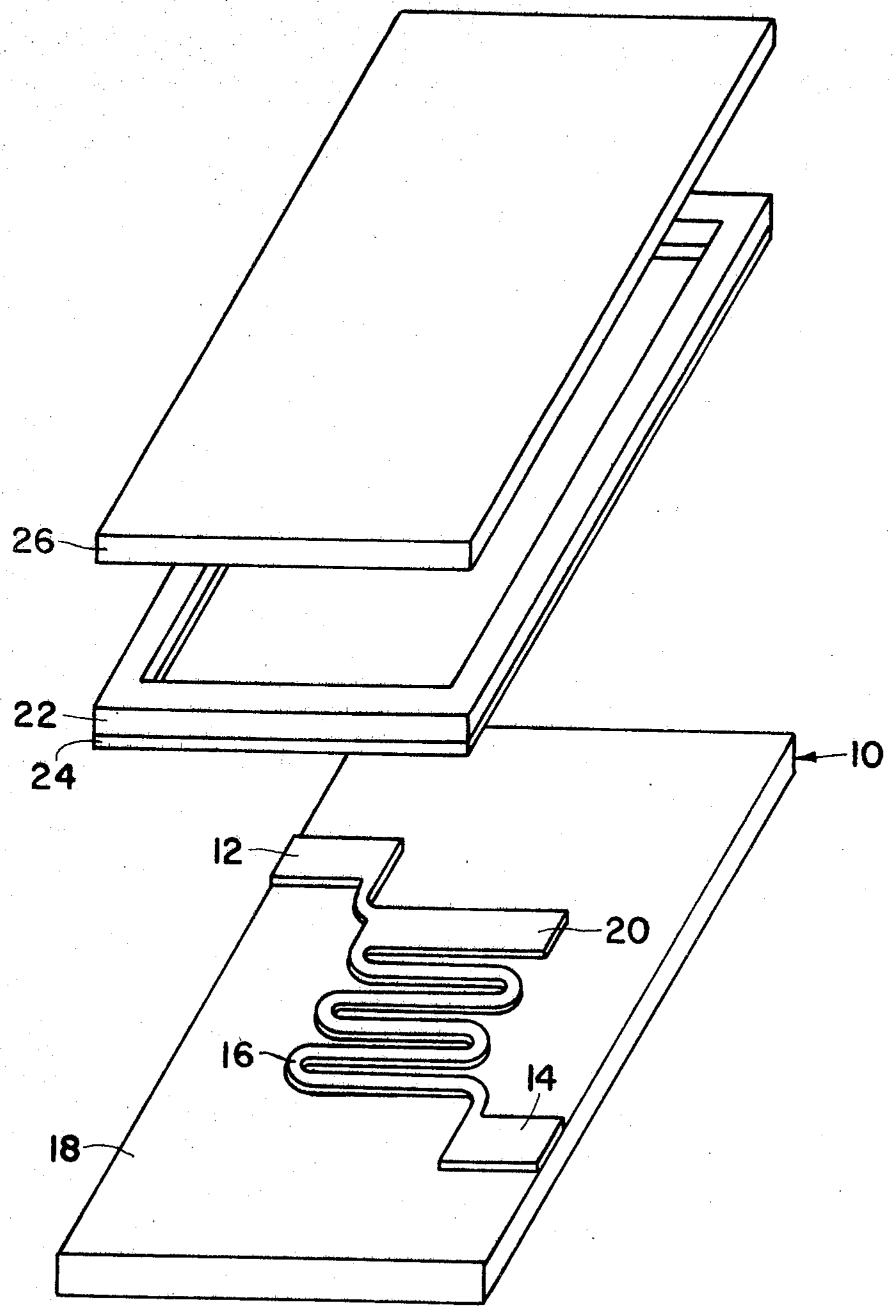
FIG. 1 is an exploded oblique view illustrating the components which comprise the enclosure of the present invention.

Referring to FIG. 1, a film microcircuit unit 10 is illustrated having circuit contact plates 12 and 14, and a thin film resistor 16 formed on substrate 18. Film resistor 16 is formed with a resistance value less than that ultimately desired by leaving a portion 20 of the resistance film unpatterned so that the length to width ratio of the total resistance path may thereafter be increased to provide the resistance value desired. The resistance film may be formed of metallic oxides or the like. For a clear understanding of such resistance films, their characteristics, and one example of their application, reference is made to U.S. Pat. Nos. 2,564,706 and 2,564,707 issued to John M. Mochel. The method of forming such circuits do not form part of the present invention and any suitable method, known to one familiar with the art, may be employed. The substrate materials may be any suitable dielectric material such as alumina, glass, ceramic, glazed metals, glazed ceramic, glass-ceramic, or combinations thereof, and one familiar with the art can readily select a suitable substrate.

A metallic ring 22 having an adherent film or coating 24 of vitreous glazing material is also shown in FIG. 1. A particularly suitable material for ring 22 is aluminum, however, other materials such as copper, nickel-iron, stainless steel, or the like may be used. The vitreous glazing material may be sprayed on in molten form, applied as a frit and then fired, or the like, and one familiar with the art can readily select a suitable method for applying the glazed coating. The vitreous glazing material must have a coefficient of thermal expansion compatible with that of the substrate material, that is sufficiently close to that of the substrate material so that when the coated ring is sealed to the substrate excessive stresses will not be set up within the glazing material upon cooling. Such excessive stresses cause the glazing material to check or crack making a hermetic seal impossible. In addition, the glazing material must adhere well to both the ring and substrate, and must have a high resistivity and low dielectric constant. A metallic cover plate 26 is shown disposed adjacent ring 22. The preferred material for sheet 26 is aluminum, however, other material sealable to ring 22, such as the materials listed for ring 22, may also be used.

Examples of some suitable glazing material compositions include those of the type described in co-pending patent application Ser. No. 401,221, filed Oct. 2, 1964, entitled "Sealing Glasses and Method," by F. Martin. These compositions comprise, in percent by weight on an oxide basis, from about 60% to 80% PbO, from 5% to 18% $TiO_2$, at least 1% $B_2O_3$, and at least 5% $SiO_2$, the total of $B_2O_3$ and $SiO_2$ being from 10% to 20%. These compositions may optionally comprise from a trace up to 20% of at least one divalent metal oxide selected from the group consisting of BaO and ZnO, the total of the divalent metal oxides, including PbO, being from 60% to 80%. Compositions especially suitable for the present purposes are those containing from about 10% to 13% of $TiO_2$.

Figure 2:
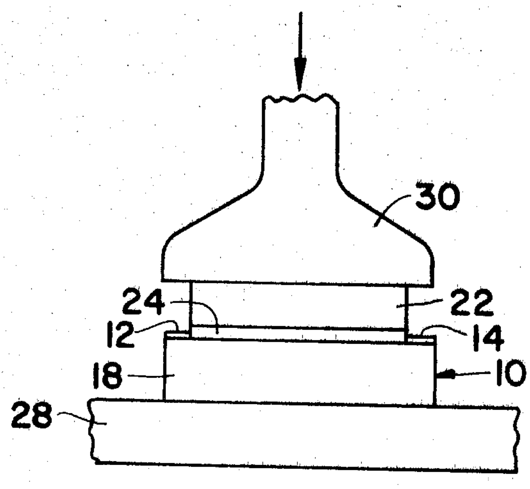
FIG. 2 is a side elevation illustrating bonding a metallic ring to a dielectric substrate.

Referring to FIG. 2, microcircuit unit 10 is shown disposed on anvil or rigid support 28 with ring 22 and its adherent coating 24 placed adjacent the microcircuit side of substrate 18. Heated tool 30 is caused to contact ring 22 and exert a force in the direction of the arrow shown, fusing coating 24 to substrate 18 and contact plates 12 and 14. Such fusing forms a hermetic seal between ring 22 and microcircuit unit 10. Tool 30 may be heated by any method well known in the art, such as for example, induction heating. When desired, support 28 may be suitably cooled to remove some of the heat conducted to substrate 18 during the fusing process thereby minimizing any deleterious effects to the microcircuit element which may result from excessive heating.

Figures 3, 5:
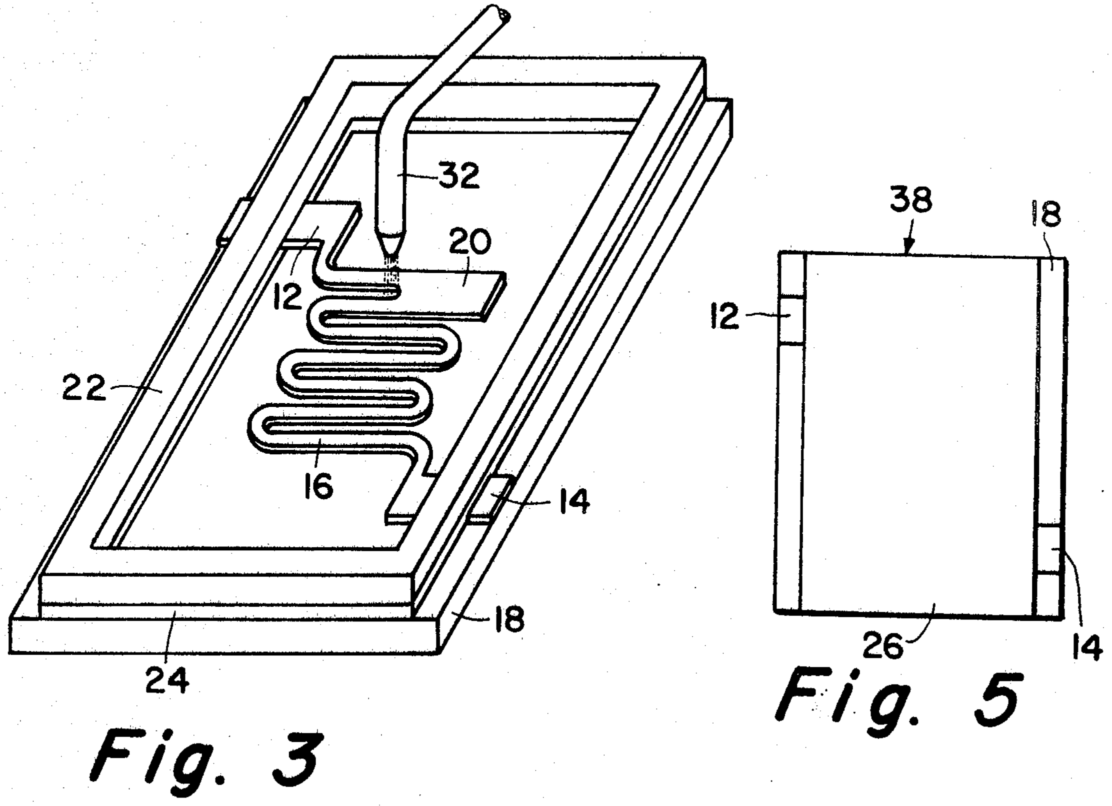
FIG. 3 is an oblique view illustrating the adjustment of the value of resistance of a film resistor prior to encapsulation.
FIG. 5 is a plan view illustrating an electrical device encapsulated in accordance with the present invention.

After the fusing step, the values of the electrical properties of the circuit elements may be adjusted, as for example, by increasing the length to width ratio of resistor 16 by removing the part of unpatterned portion 20 of the resistance film with a precision sand blast stream produced by nozzle 32, as illustrated in FIG. 3. It is also contemplated, that the circuit elements may be formed on substrate 18 or attached to a partially applied circuit at this time. Transistors, capacitors, and the like are examples of suitable electrical components which may be attached to partially formed circuits.

Figure 4:
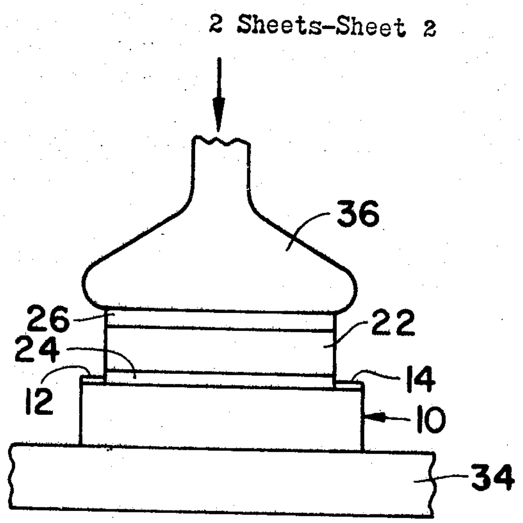
FIG. 4 is a side elevation illustrating encapsulation of an electrical device.

After the circuit is suitably adjusted or compensated and all elements are attached thereto, it is in condition for final encapsulation as illustrated in FIG. 4. The assembly as described in connection with FIG. 3 is placed on an anvil or rigid support 34. Sheet 26 is placed on ring 22 and ultrasonic bonding tool 36 is brought in contact therewith. Sheet 26 is then hermetically cold bonded to ring 22 by means of ultrasonic energy in a manner well known in the art. Such ultrasonic bonding does not significantly raise the temperature of the device. Other methods of forming a cold bond may also be used, as for example, soldering, welding, diffusion bonding, and the like. By a cold bond is meant one that is formed at a temperature less than about 250° C. at the device. In the two step encapsulation method of the present invention any deleterious affects to the device elements brought about by the fusion of coating 24 to unit 10 are removed during the adjustment or compensation step prior to the cold bonding encapsulation step, thereby resulting in an electrical device having the precise electrical values desired.

FIG. 5 illustrates a completed device 38. Contact plates 12 and 14 are shown extending beyond the edges of sheet 26 so that contact may be made with the encapsulated circuit element.

A typical example of this invention is illustrated by the following. Vitreous glazing material having a thickness of about 5 mils and comprising by weight of about 68% PbO, 12% $TiO_2$, 8% $SiO_2$, 5% ZnO, and 7% $B_2O_3$ is adherently applied to one mating of an aluminum ring having a thickness of about 3 mils, forming a coating thereon. The glaze is applied by forming a layer of a frit of the material on the mating surface and thereafter firing the composite in a furnace at 620° C. for 20 minutes. A metallic oxide film resistor, having a resistance value less than that ultimately desired, together with silver contact plates, is applied to a glazed alumina substrate. A low resistance is obtained by leaving a portion of the film unpatterned.

The substrate is placed on a rigid support and the coated ring is disposed thereon surrounding the film resistor with the coated surface adjacent the substrate. A pressing tool is inductively heated to a temperature of from about 500° C. to 550° C. and brought into contact with the aluminum ring. A pressure of about 285 p.s.i. is applied by said tool to the assembly so formed for about two minutes by means of a press connected to said tool. The resistance of the film resistor may thereafter be measured and the length to width ratio of the film be increased by cutting a groove in the unpatterned portion thereof with a sandblast stream. When the desired value of resistance is reached, the cutting is stopped, the assembly is placed on a rigid support, and a sheet of aluminum having a thickness of about 3 mils is disposed on a second mating surface of the aluminum ring. An ultrasonic bonding tool is then brought in contact with the sheet ultrasonically bonding it to the ring thereby forming a hermetic seal therebetween.

The resulting encapsulated device is hermetically sealed having predetermined desired values of electrical properties and characteristics.

Another example of the present invention is illustrated by an assembly wherein the substrate is formed of beryllia, a 5 mil thickness of vitreous material glaze is applied to a 3 mil thick copper ring, and a 3 mil thick copper cover sheet.

Other examples of particularly suitable combinations of materials are an aluminum ring and cover sheet with a substrate of unglazed alumina, beryllia, glass, or glass-ceramic; or a copper ring and cover sheet with a substrate of glass-ceramic, glass, or glazed or unglazed alumina.

Although the present invention has been described with respect to specific details of certain embodiments thereof, it is not intended that such details be limitations upon the scope of the invention except insofar as set forth in the following claims.

We claim:

1. The method of enclosing an electrical device comprising the steps of providing a dielectric substrate having an electrical device disposed thereon, providing a metallic ring having two flat mating surfaces, applying an adherent film of vitreous material to one of said mating surfaces, said vitreous material having a coefficient of thermal expansion compatible with that of said substrate and a softening temperature less than the melting temperature of the substrate and ring materials, disposing said ring on the substrate surrounding said device with said film adjacent said substrate to form an assembly, applying heat and pressure to said assembly to fuse said film to said substrate forming a hermetic seal between said ring and said substrate, adjusting the value of an electrical property of said device to a predetermined value only after said ring is sealed to said substrate, then disposing a metallic sheet on the other mating surface of said ring, and thereafter hermetically bonding said sheet to said ring at a temperature less than about 250° C. at the device.

2. The method of enclosing an electrical device comprising the steps of providing a flat alumina substrate having an electrical device disposed thereon, providing an aluminum ring having two flat mating surfaces, applying an adherent film of vitreous material, having a coefficient of thermal expansion compatible with that of alumina and a softening temperature less than the melting temperature of alumina and aluminum, to one of said mating surfaces of said ring, disposing said ring surrounding said device with said film adjacent said substrate, applying heat and pressure to the assembly so formed to fuse said film to said substrate forming a hermetic seal between said ring and said substrate, adjusting the value of an electrical property of said device to a predetermined desired value only after said ring is sealed to said substrate, then disposing an aluminum sheet on the other mating surface of said ring, and thereafter hermetically bonding said sheet to said ring at a temperature of less than about 250° C. at the device.

References Cited

UNITED STATES PATENTS

| | | |
|---|---|---|
| 2,995,686 | 8/1961 | Selvin. |
| 3,105,868 | 10/1963 | Feigin et al. |
| 3,178,506 | 4/1965 | Dereich et al. |

OTHER REFERENCES

Curtis, "Crossbred Technology Automates Production of Hybrid Microcircuits," publ. Electronics June 28, 1965, pp. 66–73.

Hubacher, "Precision Resistor Manufacturing," publ. IBM Technical Disclosure Bulletin, vol. 4, No. 9, February 1962, pp. 15–16, 29–610.

DARRELL L. CLAY, Primary Examiner

U.S. Cl. X.R.

29—525; 174—25; 338—195